United States Patent [19]

Tamura et al.

[11] Patent Number: 4,687,932
[45] Date of Patent: Aug. 18, 1987

[54] RADIATION IMAGE RECORDING AND READ-OUT APPARATUS

[75] Inventors: Kaoru Tamura; Masao Takano; Tsutomu Kimura, all of Kanagawa, Japan

[73] Assignee: Fuji Photo Film Co., Ltd., Kanagawa, Japan

[21] Appl. No.: 739,793

[22] Filed: May 31, 1985

[30] Foreign Application Priority Data

Jun. 1, 1984 [JP] Japan .................................. 59-112377
Jun. 1, 1984 [JP] Japan .................................. 59-112378
Jul. 20, 1984 [JP] Japan .................................. 59-150996

[51] Int. Cl.$^4$ ........................................... G01T 1/105
[52] U.S. Cl. ............................. 250/327.2; 250/484.1; 271/202; 271/270
[58] Field of Search ..................... 250/327.2, 484.1; 271/270, 203, 202

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,400,619 | 8/1983 | Kotera et al. | 250/327.2 |
| 4,444,303 | 4/1984 | Burgess, Jr. | 198/345 |

Primary Examiner—Janice A. Howell
Assistant Examiner—Constantine Hannaher
Attorney, Agent, or Firm—Sughrue, Mion, Zinn, Macpeak and Seas

[57] ABSTRACT

In a built-in type radiation image recording and read-out apparatus, n number of stimulable phosphor sheets wherein n denotes a natural number of 3 or more are circulated and reused for image recording. Waiting zones or a stack zone for keeping waiting n−2 or more stimulable phosphor sheets exposed to a radiation are positioned between an image recording section and an image read-out section in the sheet advancing direction. Waiting zones or a stack zone for keeping waiting n−2 or more stimulable phosphor sheets subjected to image erasing are positioned between the image read-out section and the image recording section in the sheet advancing direction or between an erasing section and the image recording section. Or, a first sheet retaining section for stimulable phosphor sheets prior to erasing is positioned between the image read-out section and the erasing section, and a second sheet retaining section for erased stimulable phosphor sheets is positioned between the erasing section and the image recording section.

10 Claims, 10 Drawing Figures

RADIATION IMAGE RECORDING AND READ-OUT APPARATUS

BACKGROUND OF THE INVENTION

1. Field of the Invention

This invention relates to a radiation image recording and read-out apparatus for exposing stimulable phosphor sheets to a radiation passing through object to have radiation image of the object stored therein, exposing the stimulable phosphor sheet to stimulating rays which cause them to emit light in proportion to the stored radiation energy, and detecting and converting the emitted light into electric signals. This invention particularly relates to a radiation image recording and read-out apparatus in which the stimulable phosphor sheets are circulated and reused for recording radiation images.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet comprising the stimulable phosphor is first exposed to a radiation passing through an object to have a radiation image stored therein, and is then scanned with stimulating rays which cause it to emit light in proportion to the radiation energy stored. The light emitted from the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). In this radiation image recording and reproducing system, the stimulable phosphor sheet is used to temporarily store the radiation image in order to reproduce the final visible image therefrom in a final recording medium. For economical reasons, therefore, it is desirable that the stimulable phosphor sheet be used repeatedly.

Further, with regard to a mobile X-ray diagnostic station such as a traveling X-ray diagnostic station in the form of a vehicle like a bus which is provided with a radiation image recording and read-out apparatus for use in the aforesaid radiation image recording and reproducing system and moves from place to place to record radiation images for mass medical examinations, it is disadvantageous to load such a mobile X-ray diagnostic station with a number of stimulable phosphor sheets, and the amount of the stimulable phosphor sheets which can be loaded on the mobile X-ray diagnostic station is limited. Therefore, it is desired to load the mobile X-ray diagnostic station with stimulable phosphor sheets which can be used repeatedly, store the radiation images of the objects in the stimulable phosphor sheets, transfer the electric image signals read out from the stimulable phosphor sheets into a recording medium having a large storage capacity, such as a magnetic tape, and circulate and reuse the stimulable phosphor sheets for further image recording and read-out operations, thereby to obtain the radiation image signals of many objects. Further, when image recording is conducted continuously by circulating and reusing the stimulable phosphor sheets, it becomes possible to increase the image recording speed in mass medical examinations. This is very advantageous in practical use.

In order to reuse stimulable phosphor sheets as described above, the radiation energy remaining in the stimulable phosphor sheet after it is scanned with stimulating rays to read out the radiation image stored therein should be eliminated or erased by the method as described, for example, in Japanese unexamined patent publication No. 56(1981)-12599 or U.S. Pat. No. 4,400,619. The stimulable phosphor sheet should then be used again for radiation image recording.

From the aforesaid viewpoint, the applicant proposed in Japanese patent application No. 58(1983)-66730 a built-in type radiation image recording and read-out apparatus comprising:

(i) a circulating and conveying means for conveying at least one stimulable phosphor sheet for recording a radiation image thereon along a predetermined circulation path, (ii) an image recording section positioned on said circulation path for recording a radiation transmission image of an object on said stimulable phosphor sheet by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored therein in said image recording section, and a photoelectric read-out means for detecting light emitted from said stimulable phosphor sheet scanned with said stimulating rays to obtain an electric image signal, and (iv) an erasing section for, prior to the next image recording on said stimulable phosphor sheet for which the image read-out has been conducted in said image read-out section, exposing said stimulable phosphor sheet to erasing light to release the radiation energy remaining in said stimulable phosphor sheet, whereby said stimulable phosphor sheet is circulated through said image recording section, said image read-out section and said erasing section and reused for radiation image recording.

However, since the built-in type radiation image recording and read-out apparatus is the one proposed from the viewpoint that the apparatus is very convenient, for example, for mounting on a mobile X-ray diagnostic station, it is desirable that the apparatus can conduct continuous image recording and read-out operations at as short an interval as possible and is small.

Also, in the aforesaid built-in type radiation image recording and read-out apparatus, stimulable phosphor sheets are circulated through the image recording, image read-out and erasing steps. In general, among these steps, the time required for the image read-out step is the longest (for example, approximately 45 seconds). Therefore, from the overall viewpoint that the image recording and read-out operations are continuously carried out in a number sufficiently larger than the number of the stimulable phosphor sheets circulated in the apparatus and the image recording interval is averaged, the image recording interval is governed by the time required for the image read-out step and cannot be decreased to intervals shorter than the time required for the image read-out step. However, though the image recording and read-out intervals cannot be decreased to a value shorter than the image read-out time from an overall viewpoint, it would be very advantageous in practice that the apparatus be fabricated to conduct image recording operations continuously without any waiting time from a partial viewpoint, i.e. within the range of a limited number of image recording operations. This is because, when a plurality of image recording operations are conducted for one type of object, for example, in mass medical examinations, it is possible to conduct the image recording operation for the object continuously without waiting time. Though a slightly long time is taken for the apparatus to become ready for the next image recording, no problem arises since time is also required for changing the object. Thus it is possible to conduct image recording in a manner which is advantageous in practice.

The erasing section is the section where the stimulable phosphor sheet is exposed to light. In case of exposure to light, for example, a great amount of light (luminance×time) is needed to have the stimulable phosphor sheet practically reusable for image recording. In order to shorten the time required for the image erasure, it is necessary to use an erasing light source of high output power (high luminance), which will however require a large scale apparatus and a large capacity of electric power. Therefore, it is considered advantageous to lower the output power of the light source and elongate the erasing time. In this case, however, the elongated erasing time will still necessitate a long processing time for the entire apparatus, and such processing speed is not sufficiently high.

SUMMARY OF THE INVENTION

The primary object of the present invention is to provide a built-in type radiation image recording and read-out apparatus wherein the image recording interval in a continuous image recording operation is minimized.

Another object of the present invention is to provide a built-in type radiation image recording and read-out apparatus wherein the image recording operation is conducted continuously with no image recording interval within the range of a limited number of image recording operations, i.e. within the range of the number of stimulable phosphor sheets circulated through the apparatus.

The specific object of the present invention is to provide a built-in type radiation image recording and read-out apparatus wherein increase in apparatus size is avoided when the apparatus is fabricated to conduct continuous image recording operation with no image recording and read-out interval.

A still another object of the present invention is to provide a compact built-in type radiation image recording and read-out apparatus wherein the recording and read-out of the radiation image can be efficiently and continuously conducted and further the processing speed for the recording and the read-out of images is sufficiently increased.

In a first aspect, the present invention provides a radiation image recording and read-out apparatus provided with
(i) a circulating and conveying means for conveying stimulable phosphor sheets for recording a radiation image therein along a predetermined circulation path,
(ii) an image recording section positioned on said circulation path for recording a radiation image of an object in each of said stimulable phosphor sheets by exposing said stimulable phosphor sheet to a radiation passing through said object,
(iii) an image read-out section positioned on said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal, and
(iv) an erasing section positioned on said circulation path for, prior to the next image recording in said stimulable phosphor sheet for which the image read-out has been conducted at said image read-out section, exposing said stimulable phosphor sheet to erasing light to release the radiation energy remaining in said stimulable phosphor sheet,
wherein the improvement comprises:
(v) inserting n number of said stimulable phosphor sheets onto said circulation path, wherein n denotes a natural number of 3 or more,
(vi) positioning n−2 or more waiting zones between said image recording section and said image read-out section in the advancing direction of said stimulable phosphor sheets, each of said waiting zones keeping waiting one stimulable phosphor sheet in which said radiation image has been stored, and
(vii) positioning n−2 or more waiting zones between said image read-out section and said image recording section in the advancing direction of said stimulable phosphor sheets, each of said waiting zones keeping waiting one stimulable phosphor sheet from which said remaining radiation energy has been released.

In a second aspect, the present invention provides a built-in type radiation image recording and read-out apparatus as described above, wherein the improvement comprises:
(v) inserting n number of said stimulable phosphor sheets onto said circulation path, wherein n denotes a natural number of 3 or more,
(vi) positioning a stack zone between said image recording section and said image read-out section in the advancing direction of said stimulable phosphor sheets, said stack zone keeping n−2 or more stimulable phosphor sheets, in which said radiation images have been stored, waiting in the stacked form, and
(vii) positioning a stack zone between said erasing section and said image recording section in the advancing direction of said stimulable phosphor sheets, said stack zone keeping n−2 or more stimulable phosphor sheets, from which said remaining radiation energy has been released, waiting in the stacked form.

In a third aspect, the present invention provides a radiation image recording and read-out apparatus as described above, wherein the improvement comprises the provision of:
(v) a first sheet retaining section positioned on said circulation path between said image read-out section and said erasing section for retaining said stimulable phosphor sheets before they are sent to said erasing section, and (vi) a second sheet retaining section positioned on said circulation path between said erasing section and said image recording section for retaining said stimulable phosphor sheets after they pass through said erasing section.

In the first and second aspect of the present invention mentioned above, n number of stimulable phosphor sheets wherein n denotes a natural number of 3 or more, i.e. at least three stimulable phosphor sheets, are inserted onto the circulation path. Therefore, it is possible to minimize the image recording interval in the continuous image recording operation from the overall viewpoint.

Specifically, in the built-in type radiation image recording and read-out apparatus of the present invention, the stimulable phosphor sheets are circulated through the image recording step, the image read-out step and the erasing step. In general, the image read-out step is the step requiring the longest time, the erasing step requires approximately the same time as the image read-out step, and the image recording plus conveyance requires a slightly shorter time than the time required for the image read-out step. Therefore, when at least three stimulable phosphor sheets are circulated, one stimulable phosphor sheet may be assigned to the image read-out step, another stimulable phosphor sheet may be assigned to the erasing step, and one remaining stimulable phosphor sheet may be allocated to the image recording step or conveyance. Thus the image read-out step requiring the longest time in the apparatus can be operated without halt, and it is possible to decrease the image recording interval in the continuous image recording operation from the overall viewpoint to the shortest time, i.e. to the time equal to the image read-out time.

Also, the apparatus of the present invention is provided with the waiting zones or the stack zone which keeps waiting $n-2$ or more exposed stimulable phosphor sheets, wherein n denotes the number of the stimulable phosphor sheets housed and circulated in the apparatus, between the image recording section and the image read-out section in the sheet advancing direction. The apparatus is also provided with the waiting zones or the stack zone which keeps waiting $n-2$ or more erased stimulable phosphor sheets between the image read-out section and the image recording section in the sheet advancing direction or between the erasing section and the image recording section. Therefore, for n number of the stimulable phosphor sheets housed and circulated in the apparatus, it is possible to conduct image recording continuously without image recording interval.

Specifically, when image recording operation is conducted continuously without image recording interval for n number of the circulated stimulable phosphor sheets, though the last stimulable phosphor sheet may remain at the image recording section after exposure to a radiation, $n-1$ preceding stimulable phosphor sheets must be conveyed out of the image recording section immediately after exposure to a radiation so that the next stimulable phosphor sheet may be carried into the image recording section for the next image recording step. In this case, though the first stimulable phosphor sheet is conveyed out of the image recording section into the image read-out section immediately after exposure to a radiation and the second sheet can be carried into the image recording section, the second sheet cannot be carried into the image read-out section immediately after exposure to a radiation. This is because the image read-out time is very much longer than the image recording time and image read-out is still being conducted for the first sheet at the image read-out section. Therefore, in the case where there is no waiting zone or stack zone between the image recording section and the image read-out section, the second sheet cannot be conveyed out of the image recording section, and it becomes impossible to conduct image recording continuously for the third and subsequent sheets. In the apparatus of the present invention, since the waiting zones or the stack zone which keeps waiting at least $n-2$ sheets is positioned between the image recording section and the image read-out section, after the first exposed sheet is conveyed into the image read-out section, $n-2$ subsequent sheets may be conveyed sequentially into the waiting zones or the stack zone immediately after exposure to a radiation. Accordingly, it is possible to continuously carry sheets into the image recording section up to the n'th sheet and to continuously conduct an image recording operation for n number of the sheets.

On the other hand, in order to conduct image recording operations continuously for n number of stimulable phosphor sheets, it is necessary to feed n number of the erased stimulable phosphor sheets continuously into the image recording section. However, since the erasing time at the erasing section positioned on the upstream side of the image recording section is very much longer than the image recording time, it is impossible to feed the erased sheets continuously to the image recording section unless several erased sheets are stored beforehand at the image recording section. In the apparatus of the present invention, since the waiting zones or the stack zone which keeps waiting at least $n-2$ erased sheets is positioned between the image read-out section and the image recording section or between the erasing section and the image recording section in the sheet advancing direction, it is possible to feed n number of erased sheets continuously to the image recording section. Specifically, after the first erased sheet is fed to the image recording section, $n-2$ erased sheets waiting at the waiting zones or the stack zone are sequentially fed to the image recording section. Then, the last sheet remaining at the image read-out section is fed to the image recording section via the erasing step. In this case, since the first sheet and $n-2$ subsequent sheets has passed through the erasing step, they can be fed continuously to the image recording section. Though erasing has not been conducted for the last sheet, image recording is conducted on $n-1$ sheets before the last sheet is fed to the image recording section via the erasing section. Therefore, normally, erasing for the last sheet is finished while image recording is conducted for $n-1$ preceding sheets, and the last sheet can be fed without delay to the image recording section.

At the image read-out section, stimulating rays may be deflected in the main scanning direction, and the stimulable phosphor sheet may be moved at a predetermined speed in the sub-scanning direction. Or, the stimulable phosphor sheet may stand still, and stimulating rays may be deflected in the main scanning direction and moved at a predetermined speed in the sub-scanning direction. In any case, in the first or second aspect of the present invention mentioned above, it is possible to maintain the stimulable phosphor sheet at the image read-out section after the image stored therein is read out at the image read-out section. Also, in the first aspect of the present invention, when waiting zones for more than n−1 sheets are positioned between the image recording section and the image read-out section in the sheet advancing section and between the image read-out section and the image recording section in the sheet advancing direction, it is possible to conduct continuous image recording operation at least for n number of sheets.

In the second aspect of the present invention mentioned above, since stack zones which keep the sheets waiting in the stacked form are used, the size of the apparatus does not increase even when the number n of the sheets circulated in the apparatus becomes large.

In the third aspect of the present invention mentioned above, since the stimulable phosphor sheets after the image read-out step can be retained at the first sheet retaining section, it is possible to conduct image recording and read-out continuously regardless of the erasing step even when the erasing section is in operation and the next stimulable phosphor sheet cannot be fed thereto. After image recording and read-out operations are finished, the sheets retained at the first sheet retaining section may be subjected to erasing for sufficient time at the erasing section and then retained at the second sheet retaining section. Therefore, it is possible to conduct the next image recording and read-out operations continuously and quickly by use of the erased sheets. Therefore, the apparatus is advantageous particularly when images of many portions of the same object should be recorded quickly or when many radiation images recorded should be quickly reproduced for viewing purposes. Also, it becomes possible to efficiently utilize idle time of the apparatus caused by object replacement and positioning as the erasing time, and therefore to decrease the energy requirement at the erasing section. Accordingly, the apparatus is very economical.

DESCRIPTION OF THE PREFERRED EMBODIMENTS

The present invention will hereinbelow be described in further detail with reference to the accompanying drawings.

Figure 1:
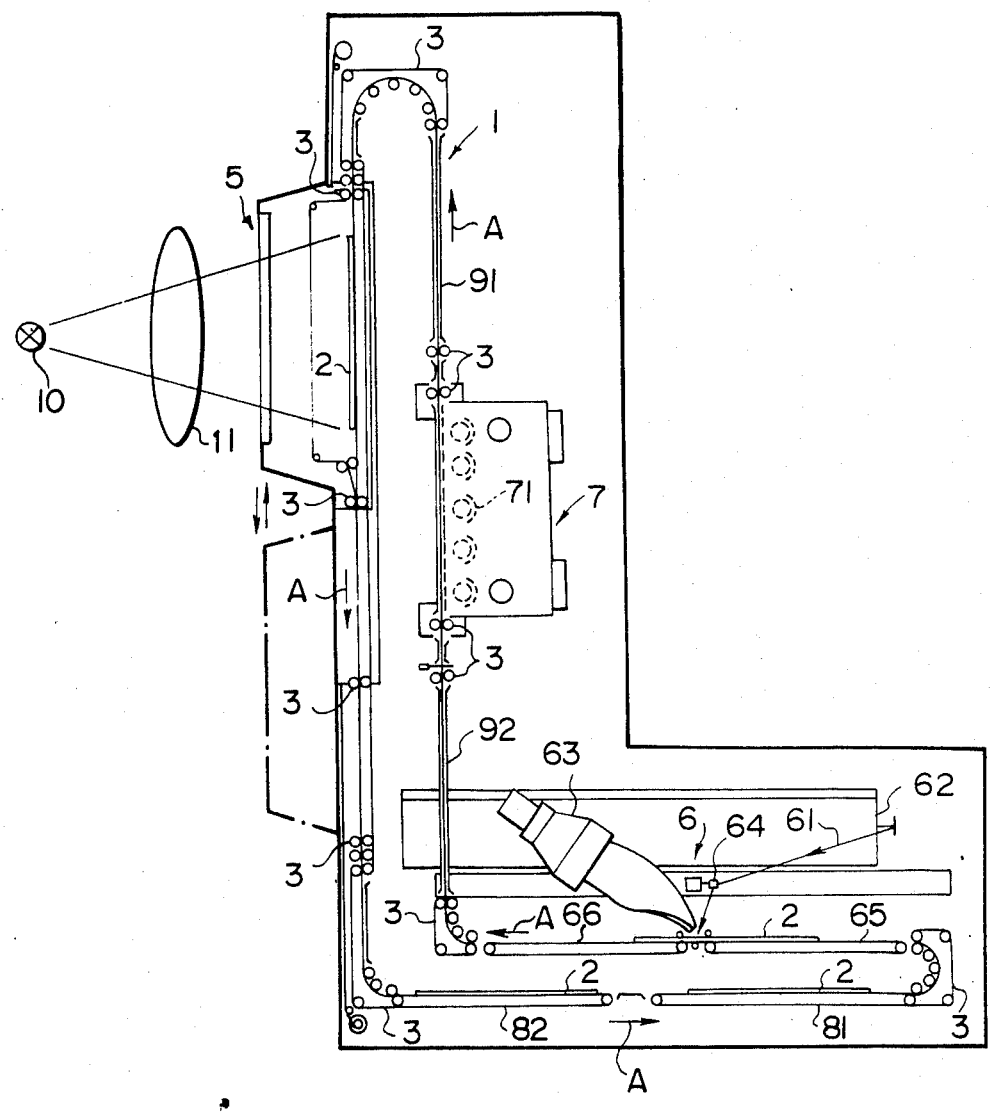
FIG. 1 is a schematic side view showing an embodiment of the radiation image recording and read-out apparatus in accordance with the present invention, wherein n−2 waiting zones are positioned between the image recording section and the image read-out section in the sheet advancing direction and between the image read-out section and the image recording section in the sheet advancing direction.

Referring to FIG. 1, the radiation image recording and read-out apparatus is provided with an L-shaped circulation path, and stimulable phosphor sheets 2 are conveyed and circulated by a circulation and conveyance means 3 comprising conveyor rollers, conveyor belts and the like along the circulation path 1.

An image recording section 5, an image read-out section 6 and an erasing section 7 are positioned in the sheet advancing direction as indicated by the arrow A on the circulation path 1.

At the image recording section 5, the stimulable phosphor sheet 2 is exposed to a radiation emitted by a radiation source 10 and passing through an object 11 to have a radiation image of the object 11 stored in the sheet 2. In this embodiment, the position of the image recording section 5 is adjustable vertically.

The exposed sheet 2 is conveyed by the circulation and conveyance means 3 in the direction as indicated by the arrow A along the circulation path 1 into the image read-out section 6.

The image read-out section 6 comprises a stimulating ray source 62 for emitting stimulating rays 61, e.g. a laser beam, for scanning the sheet 2, and a photoelectric read-out means 63, e.g. a photomultiplier, for detecting light emitted by the sheet 2 upon exposure to the stimulating rays 61 and converting it into an electric image signal. Reference numeral 64 denotes a galvanometer mirror. Since image read-out is conducted by moving the sheet 2 at a predetermined speed, the image read-out section 6 is provided with a space 65 for one sheet where the sheet 2 just prior to the image read-out is positioned and a space 66 for one sheet where the sheet 2 just after the image read-out is positioned.

After the read-out step, the sheet 2 is sent by the circulation and conveyance means 3 to the erasing section 7.

The erasing section 7 is provided with many erasing light sources 71 constituted by fluorescent lamps or the like. The sheet 2 is exposed to erasing light emitted by the erasing light sources 71 to release the radiation energy remaining in the sheet 2.

The erased sheet 2 is then sent by the circulation and conveyance means 3 to the image recording section 5.

In this embodiment, four (n=4) sheets 2 are inserted onto the circulation path 1, and two (=n−2) waiting zones 81 and 82 for keeping the exposed sheets 2 waiting are positioned between the image recording section 5 and the image read-out section 6 in the sheet advancing direction. Also, two (=n−2) waiting zones 91 and 92 for keeping the erased sheets 2 waiting are positioned between the image read-out section 6 and the image recording section 5 in the sheet advancing direction.

Each of the waiting zones 81, 82, 91, and 92 has a space for one sheet.

Figure 2:
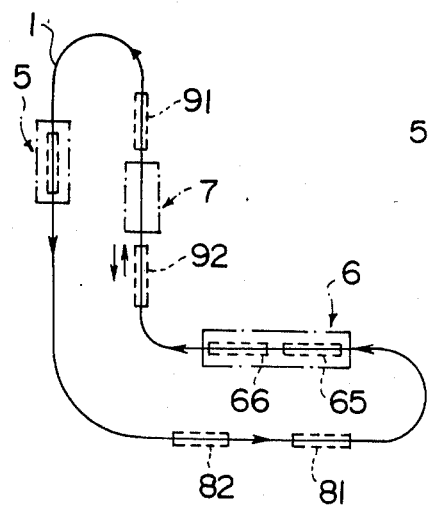
FIG. 2 is an explanatory view showing the apparatus of FIG. 1, FIGS. 3 and 4 are explanatory views showing further embodiments of the apparatus in accordance with the present invention, wherein n−2 waiting zones are positioned between the image recording section and the image read-out section in the sheet advancing direction and between the image read-out section and the image recording section in the sheet advancing direction.

Continuous image recording operation in this embodiment will be described with reference to FIG. 2.

In this embodiment, four sheets are circulated and waiting zones 81 and 82 are positioned between the image recording section 5 and the image read-out section 6. Therefore, the sheet exposed first is immediately sent to a space 65 at the image read-out section 6, and image read-out for the first sheet is started. The second sheet is then sent to the image recording section 5. After image read-out is finished for the second sheet, the second sheet is sent to the waiting zone 81, and the third sheet is sent to the image recording section 5. After image read-out is finished for the third sheet, the third sheet is sent to the waiting zone 82. Then, the fourth sheet is sent to the image recording section 5. After image read-out is finished for the fourth sheet, the fourth sheet is maintained at the image recording section 5.

Also, waiting zones 91 and 92 for keeping the erased sheets waiting are positioned between the image read-out section and the image recording section in the sheet advancing direction. Therefore, the first erased sheet is positioned at the image recording section 5, and the second sheet waits at the waiting zone 91 after erasing. The third sheet is conveyed reversely to the sheet advancing direction after erasing at the erasing section 7 and waits at the waiting zone 92. The fourth sheet is maintained at the space 66 for the read-out sheet at the image read-out section 6. Accordingly, immediately when image recording on the first sheet positioned at the image recording section 5 is finished, the second sheet waiting at the waiting zone 91 is sent to the image recording section 5, and the third sheet waiting at the waiting zone 92 is conveyed into the waiting zone 91. Also, the fourth sheet positioned at the space 66 of the image read-out section 6 is sent to the erasing section 7, and erasing is started. When image recording on the second sheet is finished, the third sheet waiting at the waiting zone 91 is sent to the image recording section 5, and image recording on the third sheet is conducted. When image recording on the third sheet is finished, the fourth sheet for which erasing has been finished while image recording is conducted on the second and third sheets is conveyed from the erasing section 7 to the image recording section 5, and image recording on the fourth sheet is carried out.

Figure 3:
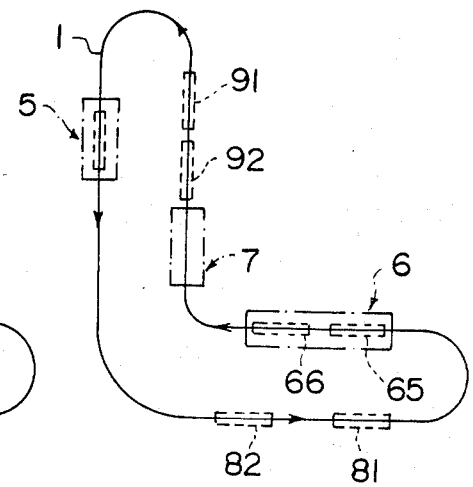

In this embodiment, of the waiting zones 91 and 92 for the erased sheets positioned between the image read-out section 6 and the image recording section 5, the waiting zone 92 is positioned between the image read-out section 6 and the erasing section 7 so that the sheet erased at the erasing section 7 is moved back and made to keep waiting at the waiting zone 92. However, as shown in FIG. 3, it is also possible to position the waiting zones 91 and 92 between the erasing section 7 and the image recording section 5. In this case, it becomes possible to convey the fourth sheet after image read-out to the erasing section 7 for conducting erasing on the fourth sheet and to move the fourth sheet back to the space 66 at the image read-out section 6 for keeping the sheet waiting there.

Figure 4:
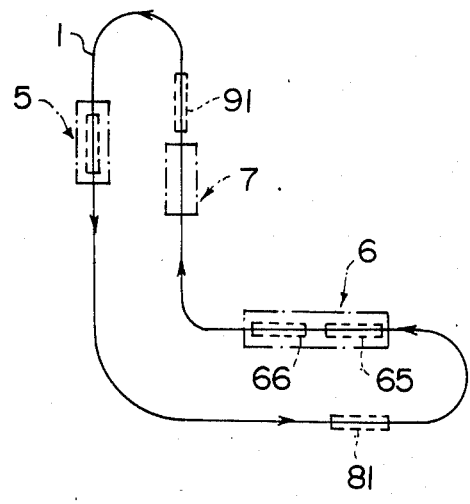

In FIG. 4, three (n=3) sheets are circulated in the apparatus. The first sheet wherein a radiation image is recorded at the image recording section 5 is sent to the space 65 at the image read-out section 6, and image read-out is started. The second sheet after image recording is kept to wait at the waiting zone 81, and the third sheet after image recording is kept to wait at the image recording section 5. When the erased sheets are fed to the image recording section 5, the first sheet is sent to the image recording section 5, the second sheet is positioned at the waiting zone 91, and the third sheet is positioned at the space 66 of the image read-out section 6 by being returned thereto after erasing. Therefore, the three erased sheets can be continuously fed to the image recording section 5.

In the aforesaid embodiments, $n-2$ sheet waiting zones are positioned between the image recording section 5 and the image read-out section 6 in the sheet advancing direction and between the image read-out section 6 and the image recording section 5 in the sheet advancing direction. Further embodiments wherein $n-1$ sheet waiting zones are positioned between the image recording section 5 and the image read-out section 6 in the sheet advancing direction and between the image read-out section and the image recording section in the sheet advancing direction will be described below with reference to FIGS. 5 to 8.

Figure 5:
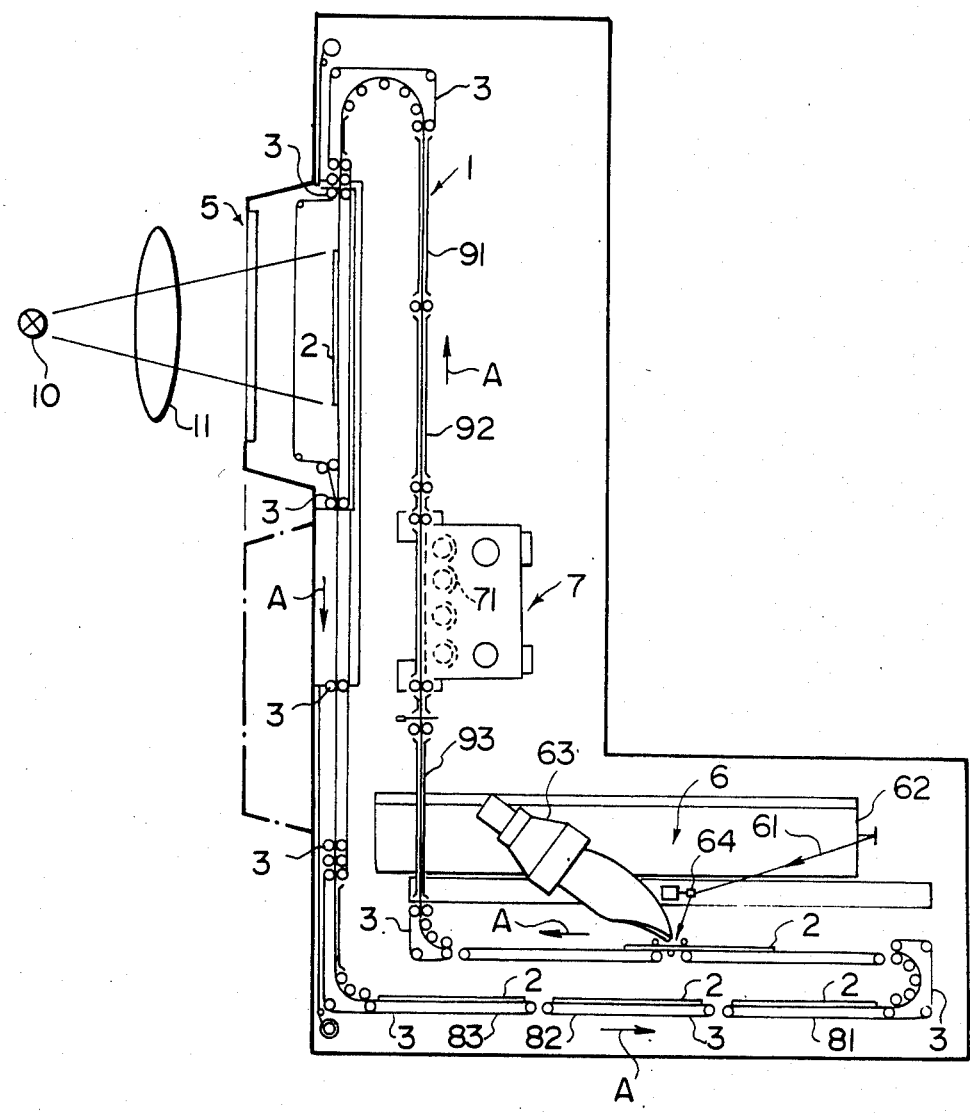
FIG. 5 is a schematic side view showing another embodiment of the apparatus in accordance with the present invention, wherein n−1 waiting zones are positioned between the image recording section and the image read-out section in the sheet advancing direction and between the image read-out section and the image recording section in the sheet advancing direction.

In FIG. 5, similar elements are numbered with the same reference numerals with respect to FIG. 1. The embodiment of FIG. 5 is similar to that of FIG. 1, except that a waiting zone 83 for one sheet is added between the image recording section and the image read-out section, and a waiting zone 93 for one sheet is added between the image read-out section 6 and the image recording section 5.

Continuous image recording and read-out operations in FIG. 5 will be described with reference to FIG. 6.

Figure 6:
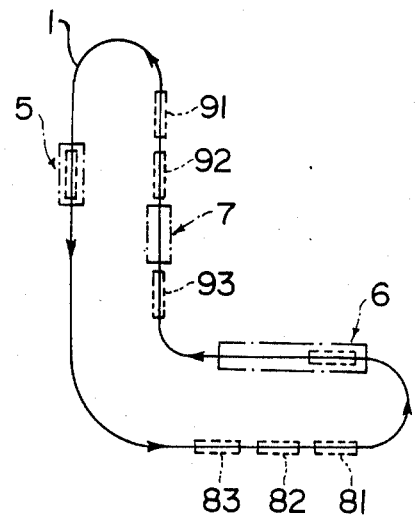
FIG. 6 is an explanatory view showing the apparatus of FIG. 5, FIGS. 7 and 8 are explanatory views showing further embodiments of the apparatus in accordance with the present invention, wherein n−1 waiting zones are positioned between the image recording section and the image read-out section in the sheet advancing direction and between the image read-out section and the image recording section in the sheet advancing direction.

In FIG. 6, four sheets are circulated and waiting zones 81, 82 and 83 are positioned between the image recording section 5 and the image read-out section 6. Therefore, the sheet exposed first is immediately sent to the image read-out section 6, and image read-out for the first sheet is started. The second sheet is then sent to the image recording section 5. After image read-out is finished for the second sheet, the second sheet is sent to the waiting zone 81, and the third sheet is sent to the image recording section 5. After image read-out is finished for the third sheet, the third sheet is sent to the waiting zone 82. Then, the fourth sheet is sent to the image recording section 5. After image read-out is finished for the fourth sheet, the fourth sheet is sent to the waiting zone 83.

Also, waiting zones 91, 92 and 93 ($n-1=3$) for keeping the erased sheets waiting are positioned between the image read-out section and the image recording section in the sheet advancing direction. Therefore, the first erased sheet is positioned at the image recording section 5, and the second and third sheets wait at the waiting zones 91 and 92 after erasing. The fourth sheet is conveyed reversely to the sheet advancing direction after erasing at the erasing section 7 and waits at the waiting zone 93. Accordingly, immediately image recording on the first sheet positioned at the image recording section 5 is finished, the second sheet waiting at the waiting zone 91 is sent to the image recording section 5, and the third and fourth sheets waiting at the waiting zones 92 and 93 are conveyed into the waiting zones 91 and 92. When image recording on the second sheet is finished, the third sheet waiting at the waiting zone 91 is sent to the image recording section 5, and the fourth sheet waiting at the waiting zone 92 is sent to the waiting zone 91. When image recording on the third sheet is finished, the fourth sheet is conveyed to the image recording section 5, and image recording on the fourth sheet is carried out.

Figure 7:
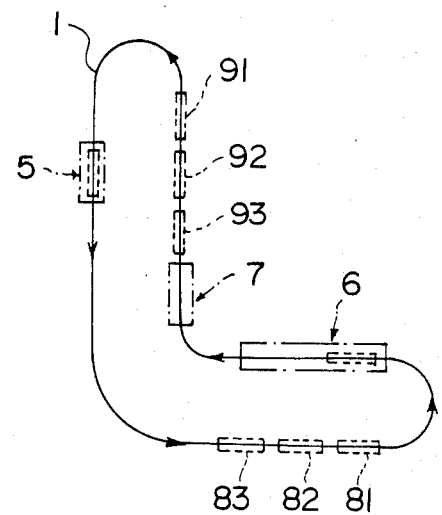

In this embodiment, of the waiting zones 91, 92 and 93 for the erased sheets positioned between the image read-out section 6 and the image recording section 5, the waiting zone 93 is positioned between the image read-out section 6 and the erasing section 7 so that the sheet erased at the erasing section 7 is moved back and made to keep waiting at the waiting zone 93. However, as shown in FIG. 7, it is also possible to position the waiting zones 91, 92 and 93 between the erasing section 7 and the image recording section 5.

Figure 8:
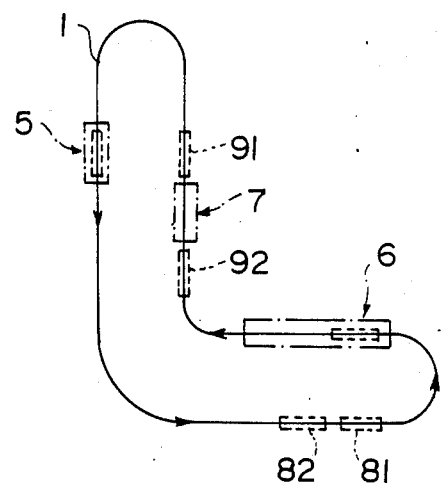

In FIG. 8, three (n=3) sheets are circulated in the apparatus. The first sheet wherein a radiation image is recorded at the image recording section 5 is sent to the image read-out section 6, and image read-out is started. The second sheet after image recording is kept to wait at the waiting zone 81, and the third sheet is kept to wait at the waiting zone 82. When the erased sheets are fed to the image recording section 5, the first sheet is sent to the image recording section 5, the second sheet is positioned at the waiting zone 91, and the third sheet is positioned at the waiting zone 92 by being returned thereto after erasing. Therefore, the three erased sheets can be continuously fed to the image recording section 5.

In the aforesaid embodiments, $n-2$ or $n-1$ sheet waiting zones are positioned between the image recording section 5 and the image read-out section 6 in the sheet advancing direction and between the image read-out section 6 and the image recording section 5 in the sheet advancing direction. However, it is also possible to use more sheet waiting zones.

As for the waiting zones, $n-2$ or more independent waiting zones having a space for one sheet may be used, or a single waiting zone having a space for $n-2$ or more sheets may be used at each position.

Figure 9:
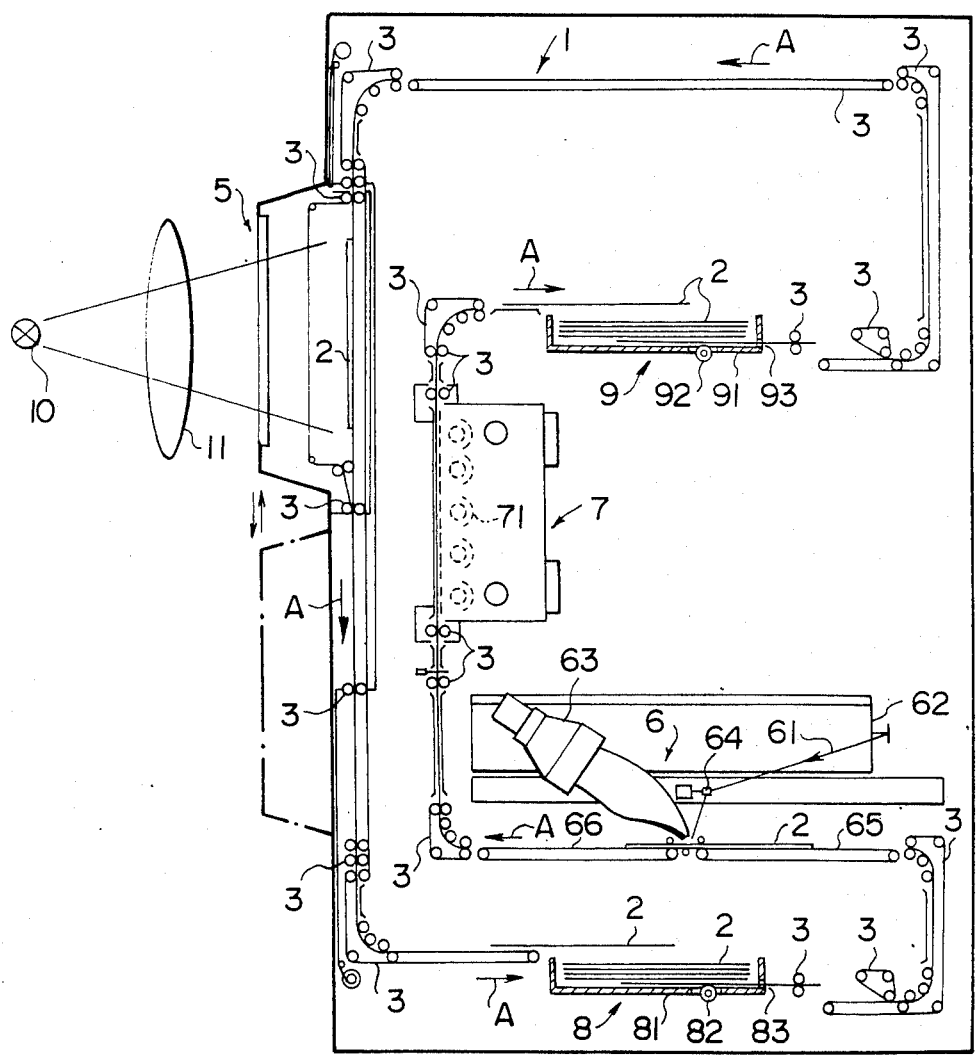
FIGS. 9 and 10 are schematic side views showing still further embodiments of the apparatus in accordance with the present invention.

FIG. 9 shows a further embodiment of the apparatus of the present invention. In FIG. 9, similar elements are numbered with the same reference numerals with respect to FIG. 1. In this embodiment, the circulation path is fabricated in a U-shaped form, and n number of sheets 2 where $n \geq 3$ are inserted onto the circulation path 1. A stack zone 8 for keeping waiting $n-2$ exposed sheets in the stacked form is positioned between the image recording section 5 and the image read-out section 6 in the sheet advancing direction. Also, a stack zone 9 for keeping waiting $n-2$ erased sheets in the stacked form is positioned between the erasing section 7 and the image recording section 5.

The stack zones 8 and 9 respectively comprise vessels 81, 91 for housing $n-2$ sheets in the stacked form, delivery drive rollers 82, 92 positioned at the bottoms of the vessels 81, 91, and sheet outlets 83, 93 positioned at the lower end portions of the front side walls of the vessels 81, 91 so that the sheets are delivered in the order of housing in the vessels 81, 91.

It is also possible to position a plurality of vessels similar to the vessels 81, 91 in the step-like form so that $n-2$ sheets are kept waiting. In this case, the number of the vessels should be two or three since the apparatus would become large if more vessels are positioned in the step-like form.

Continuous image recording and read-out operations in the embodiment of FIG. 9 wherein n=4 will be described below.

The first exposed sheet 2 is immediately sent to the space 65 of the image read-out section 6, and image read-out on the first sheet 2 is started. The second sheet is then sent to the image recording section 5, and is sent to the stack zone 8 which can store two (=n−2) sheets after image recording. Then, the third sheet is sent to the image recording section 5, and is conveyed to the stack zone 8 after image recording. The fourth sheet is then sent to the image recording section 5, and is maintained at the image recording section 5 after image recording.

On the other hand, the stack zone 9 which can store two erased sheets is positioned between the erasing section 7 and the image recording section 5. Therefore, the first erased sheet 2 is sent to the image recording section 5, and the second and third sheets are stored at the stack zone 9 after erasing. When image read-out is finished on the fourth sheet, the fourth sheet is conveyed to the erasing section 7 where the remaining radiation energy is erased, and is then moved back to the space 66 at the image read-out section 6 and maintained there. Therefore, immediately when image recording on the first sheet positioned at the image recording section is finished, the second sheet waiting at the stack zone 9 is sent to the image recording section 5, and the fourth sheet positioned at the space 66 of the image read-out section 6 is sent to the stack zone 9. When image recording on the second sheet is finished, the third sheet waiting at the stack zone 9 is sent to the image recording section 5, and image recording on the third sheet is started. When image recording on the third sheet is finished, the fourth sheet is conveyed from the stack zone 9 to the image recording section 5, and image recording on the fourth sheet is carried out.

Also when n=3 or n=5 or more, image recording operation can be conducted continuously at least for n sheets in the same manner as described above.

Figure 10:
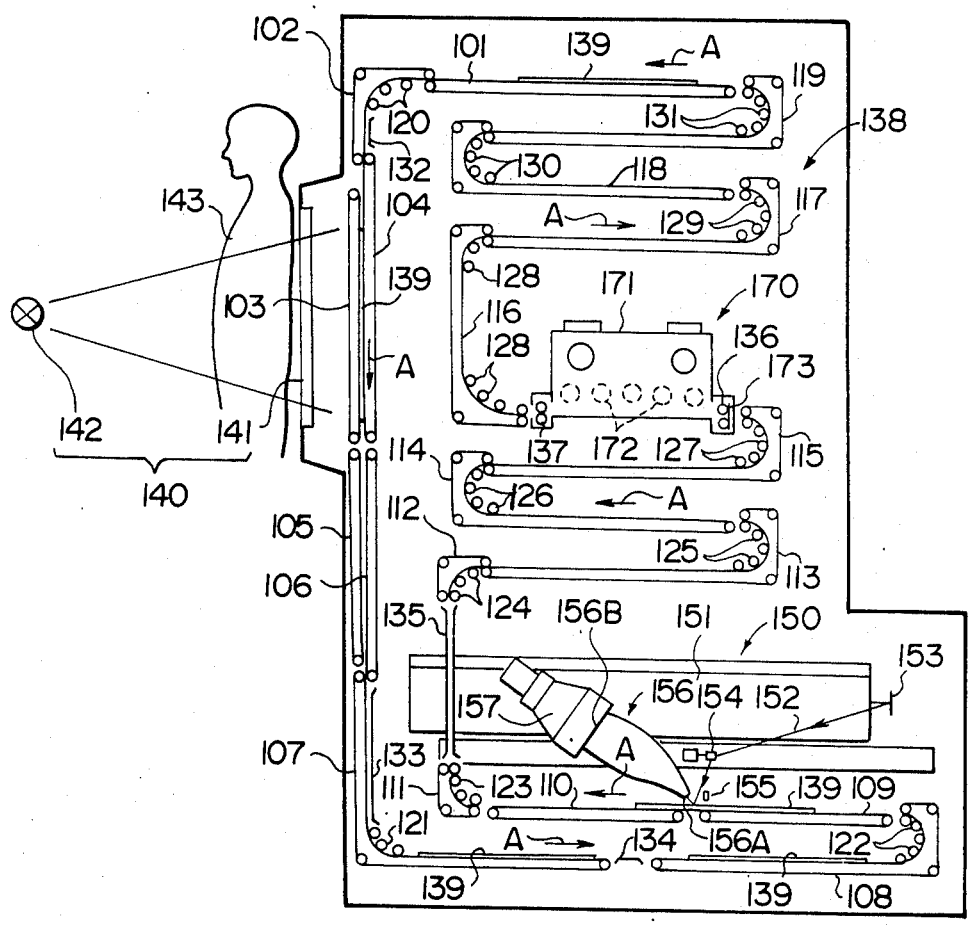

FIG. 10 shows a still further embodiment of the apparatus in accordance with the present invention. A circulation path 138 is constituted by endless belts 101, 102, 103, 104, 105, 106, 107, 108, 109, 110, 111, 112, 113, 114, 115, 116, 117, 118 and 119, guide rollers 120, 121, 122, 123, 124, 125, 126, 127, 128, 129, 130 and 131 rotated respectively by the endless belts 102, 107, 108, 111, 112, 113, 114, 115, 116, 117, 118 and 119, guide plates 132, 133, 134 and 135, and nip rollers 136 and 137. Five stimulable phosphor sheets 139 are positioned in spaced relation to each other on the circulation path 138 and are conveyed and circulated in the direction as indicated by the arrow A by the endless belts 101 to 119 and the nip rollers 136 and 137 as the sheet circulating and conveying means.

The endless belts 103 and 104 are positioned to vertically hold the stimulable phosphor sheet 139 therebetween. An image recording section 140 is constituted by an image recording stand 141 positioned on the left side of the endless belts 103 and 104, and a radiation source 142, e.g. an X-ray source, spaced from the image recording stand 141 to stand face to face with the endless belts 103 and 104. When a radiation image of an object 143 is recorded on the sheet 139, the sheet 139 is held between the endless belts 103 and 104, and the radiation source 142 is activated with the object 143 standing in front of the image recording stand 141. In this manner, the sheet 139 is exposed to a radiation passing through the object 143 to have a radiation image of the object 143 stored in the sheet 139.

An image read-out section 150 is positioned at the lower section of the circulation path 138. At the image read-out section 150, a laser beam source 151 is positioned above the endless belt 109 constituting a part of the image read-out section 150, and a mirror 153 and a galvanometer mirror 154 are positioned for scanning a laser beam 152 emitted by the laser beam source 151 on the sheet 139 placed on the endless belt 109. The galvanometer mirror 154 is swung in both directions to scan the laser beam 152 in the main scanning direction on the sheet 139 carrying the radiation image stored therein. The sheet 139 is subjected to image recording at the image recording section 140 and then conveyed by the sheet circulating and conveying means to the image read-out section 150. A light guiding reflection mirror 155 and a light guide member 156 are positioned along the main scanning direction at the scanning portion of the laser beam 152 on the sheet 139. When the sheet 139 is exposed to the laser beam 152, the sheet 139 emits light in proportion to the stored radiation energy. The light emitted by the sheet 139 directly towards the light guide member 156 and the light emitted by the sheet 139 and reflected by the light guiding reflection mirror 155 enters the light guide member 156 from a light input face 156A thereof, and is guided inside of the light guide member 156 through total reflection to a light output face 156B thereof. The light is thus detected by a photomultiplier 157 connected to the light output face 156B of the light guide member 156. Simultaneously with the scanning of the sheet 139 by the laser beam 152 in the main scanning direction, the sheet 139 is moved by the endless belt 109 in the sub-scanning direction as indicated by the arrow A approximately normal to the main scanning direction, so that the whole surface of the sheet 139 is scanned by the laser beam 152. An electric image signal obtained by the photomultiplier 157 is sent to an image processing circuit (not shown) for processing the electric image signal. The image signal thus processed is then sent to an image reproducing apparatus (not shown). The image reproducing apparatus may be a display device such as a CRT, or a device for recording a visible image by point-by-point scanning on a photographic film. Or, the image signal may be stored in a storage means such as a magnetic tape.

After image read-out is finished, the sheet 139 is conveyed by the endless belts 110 and 111 along the guide plate 135 and is sent by the endless belts 112, 113, 114 and 115 to an erasing section 170. The erasing section 170 comprises a case 171 and many erasing light sources 171, e.g. fluorescent lamps, arranged within the case 171. After a shutter 173 is opened, the sheet 139 is conveyed by the endless belt 115 until the forward end of the sheet 139 contacts the nip rollers 136. The sheet 139 is thus sent into the case 171 by the rotating nip rollers 136. Then, the shutter 173 is closed, and the erasing light sources 172 are turned on. The erasing light sources 172 mainly emit light having a wavelength within the stimulation wavelength range for the stimulable phosphor constituting the sheet 139. When the sheet 139 is exposed to the erasing light, the radiation energy remaining in the sheet 139 after the image read-out is released. At this time, since the shutter 173 is closed, no noise is generated in the read-out signal by erasing light leaking into the image read-out section 150.

After the radiation energy remaining in the sheet 139 is erased to such an extent that the next image recording on the sheet 139 is possible, the nip rollers 137 are rotated and the sheet 139 is conveyed out of the erasing section 170. Then, the sheet 139 is conveyed by the endless belts 116, 117, 118 and 119 onto the endless belt 101 and then to the image recording section 140.

The endless belts 110, 113, 114 and 115 positioned between the image read-out section 150 and the erasing section 170 constitute the first sheet retaining section so that the sheets 139 passing through the image read-out section 150 are placed and retained one by one on the endless belts 110, 113, 114 and 115. Since a relatively long time is taken for image erasing of the sheet 139 at the erasing section 170, when image recording and read-out operations are conducted continuously at high speed, the next sheet 139 is conveyed out of the image read-out section 150 before image erasing of one sheet 139 is finished at the erasing section 170. However, since the sheet 139 may be retained and kept waiting on the endless belt 115, no problem arises with regard to the next image recording and read-out. Also, the sheets 139 may be retained one by one on the endless belts 114, 113 and 110. Therefore, it is possible to utilize most efficiently the processing capacity of the image recording section 140 and the image read-out section 150 and the achieve continuous image recording and read-out operations for up to five sheets 139 regardless of the image erasing speed at the erasing section 170.

By sequentially operating the erasing section 170 after the image recording and read-out operations are finished as described above, it is possible to conduct image erasing for all of the sheets 139 retained on the endless belts 115, 114, 113 and 110. In the case where the image erasing speed at the erasing section 170 is high, when five sheets 139 are used continuously and image recording and read-out operations are conducted quickly, some preceding sheets 139 are conveyed out of the erasing section 170 while the fifth sheet 139 is positioned at the image recording section 140, and it is possible to use the preceding sheets 139 continuously for image recording after the fifth sheet 139.

The erased sheet 139 is sent by the endless belts 116, 117, 118, 119 and 101 to the endless belts 103 and 104 and used for next image recording. When image erasing is conducted at the erasing section 170 after the image recording and read-out operations are finished, the sheet 139 conveyed to the endless belts 103 and 104 is held therebetween, and the subsequent sheets 139 are sequentially placed and retained on the endless belts 101, 119, 118 and 117 as the second sheet retaining section for the subsequent image recording.

In the embodiment of FIG. 10, though any number of stimulable phosphor sheets may be circulated, provision of the first and second sheet retaining sections is advantageous only when two or more stimulable phosphor sheets are used. The number of the stimulable phosphor sheets retained at the first and second sheet retaining sections positioned before and after the erasing section is not limited to four and may be selected in accordance with the number of sheets positioned on the circulation path and the processing speeds of the image recording section, the image read-out section and the erasing section.

We claim:

1. A radiation image recording and read-out apparatus provided with
    (i) a circulating and conveying means for conveying stimulable phosphor sheets for recording a radiation image therein along a predetermined circulation path,
    (ii) an image recording section positioned on said circulation path for recording a radiation image of an object in each of said stimulable phosphor sheets by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal, and (iv) an erasing section positioned on said circulation path for, prior to the next image recording in said stimulable phosphor sheet for which the image read-out has been conducted at said image read-out section, exposing said stimulable phosphor sheet to erasing light to release the radiation energy remaining in said stimulable phosphor sheet, wherein the improvement comprises:

(v) inserting n number of said stimulable phosphor sheets onto said circulation path, wherein n denotes a natural number of 3 or more, (vi) positioning n−2 or more waiting zones between said image recording section and said image read-out section in the advancing direction of said stimulable phosphor sheets, each of said waiting zones keeping waiting one stimulable phosphor sheet in which said radiation image has been stored, and (vii) positioning n−2 or more waiting zones between said image read-out section and said image recording section in the advancing direction of said stimulable phosphor sheets, each of said waiting zones keeping waiting one stimulable phosphor sheet from which said remaining radiation energy has been released.

2. An apparatus as defined in claim 1 wherein at least one waiting zone for keeping waiting one stimulable phosphor sheet from which said remaining radiation energy has been released is positioned between said image read-out section and said erasing section in the advancing direction of said stimulable phosphor sheets, and at least one waiting zone for keeping waiting one stimulable phosphor sheet from which said remaining radiation energy has been released is positioned between said erasing section and said image recording section in the advancing direction of said stimulable phosphor sheets.

3. An apparatus as defined in claim 1 wherein said n−2 or more waiting zones for keeping waiting said stimulable phosphor sheets from which said remaining radiation energy has been released are positioned between said erasing section and said image recording section in the advancing direction of said stimulable phosphor sheets.

4. An apparatus as defined in claim 1, 2 or 3 wherein said circulation path is L-shaped.

5. An apparatus as defined in claim 1, 2 or 3 wherein said waiting zones are constituted by conveyor belts.

6. A radiation image recording and read-out apparatus provided with (i) a circulating and conveying means for conveying stimulable phosphor sheets for recording a radiation image therein along a predetermined circulation path, (ii) an image recording section positioned on said circulation path for recording a radiation image of an object in each of said stimulable phosphor sheets by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal, and (iv) an erasing section positioned on said circulation path for, prior to the next image recording in said stimulable phosphor sheet for which the image read-out has been conducted at said image read-out section, exposing said stimulable phosphor sheet to erasing light to release the radiation energy remaining in said stimulable phosphor sheet, wherein the improvement comprises:

(v) inserting n number of said stimulable phosphor sheets onto said circulation path, wherein n denotes a natural number of 3 or more, (vi) positioning a stack zone between said image recording section and said image read-out section in the advancing direction of said stimulable phosphor sheets, said stack zone keeping n−2 or more stimulable phosphor sheets, in which said radiation images have been stored, waiting in the stacked form, and (vii) positioning a stack zone between said erasing section and said image recording section in the advancing direction of said stimulable phosphor sheets, said stack zone keeping n−2 or more stimulable phosphor sheets, from which said remaining radiation energy has been released, waiting in the stacked form.

7. An apparatus as defined in claim 6 wherein each of said stack zones comprises a vessel for storing n−2 or more stimulable phosphor sheets in the stacked form, a delivery drive roller positioned at the bottom of said vessel, and a sheet outlet positioned at a lower portion of a forward side wall of said vessel.

8. An apparatus as defined in claim 6 or 7 wherein said circulation path is U-shaped.

9. A radiation image recording and read-out apparatus provided with (i) a circulating and conveying means for conveying stimulable phosphor sheets for recording a radiation image therein along a predetermined circulation path, (ii) an image recording section positioned on said circulation path for recording a radiation image of an object in each of said stimulable phosphor sheets by exposing said stimulable phosphor sheet to a radiation passing through said object, (iii) an image read-out section positioned on said circulation path and provided with a stimulating ray source for emitting stimulating rays for scanning said stimulable phosphor sheet carrying said radiation image stored therein at said image recording section, and a photoelectric read-out means for detecting light emitted by said stimulable phosphor sheet scanned by said stimulating rays to obtain an electric image signal, and (iv) an erasing section positioned on said circulation path for, prior to the next image recording in said stimulable phosphor sheet for which the image read-out has been conducted at said image read-out section, exposing said stimulable phosphor sheet to erasing light to release the radiation energy remaining in said stimulable phosphor sheet, wherein the improvement comprises the provision of:
(v) a first sheet retaining section positioned on said circulation path between said image read-out section and said erasing section for retaining said stimulable phosphor sheets before they are sent to said erasing section, and (vi) a second sheet retaining section positioned on said circulation path between said erasing section and said image recording section for retaining said stimulable phosphor sheets after they pass through said erasing section.

10. An apparatus as defined in claim 9 wherein each of said sheet retaining sections is constituted by at least one endless belt for placing one stimulable phosphor sheet thereon.

* * * * *